(12) United States Patent  
Brandemuehl et al.

(10) Patent No.: US 8,251,854 B2
(45) Date of Patent: Aug. 28, 2012

(54) TRANSMISSION APPARATUS

(75) Inventors: Robert L. Brandemuehl, Waukesha, WI (US); Jack L Peckham, Beloit, WI (US)

(73) Assignee: Durst, Division of Regal Beloit, Beloit, WI (US)

( * ) Notice: Subject to any disclaimer, the term of this patent is extended or adjusted under 35 U.S.C. 154(b) by 1047 days.

(21) Appl. No.: 12/151,591

(22) Filed: May 7, 2008

(65) Prior Publication Data

US 2009/0280945 A1    Nov. 12, 2009

(51) Int. Cl.
*F16H 37/04* (2006.01)
*F16H 3/44* (2006.01)
(52) U.S. Cl. ........................................ 475/207; 475/302
(58) Field of Classification Search .................. 475/207, 475/209, 302
See application file for complete search history.

(56) References Cited

U.S. PATENT DOCUMENTS

| | | | | |
|---|---|---|---|---|
| 5,370,014 | A * | 12/1994 | Pigozzi et al. | 74/331 |
| 6,869,379 | B2 * | 3/2005 | Voss et al. | 475/218 |
| 2008/0314661 | A1 * | 12/2008 | Soliman et al. | 180/65.4 |

* cited by examiner

*Primary Examiner* — Edwin A Young
(74) *Attorney, Agent, or Firm* — David J. Archer

(57) ABSTRACT

A transmission apparatus for transmitting power from a motor for driving an airport ground support tractor includes a torque converter for transmitting torque from the motor. A planetary gear train is structured such that in a first mode of operation, when an input shaft is rotated in a first rotational direction, a casing is rotated in the first rotational direction. However, in a second mode of operation, rotation of the casing relative to a housing is inhibited so that a support rotates in a second rotational direction. The arrangement is such that a driven end of a main shaft is secured to the support so that the support selectively drives the main shaft in the first rotational direction and the second rotational direction. An electro-hydraulic actuator selectively moves a synchro device between a first and second dispositions thereof for establishing a first and second gear ratios.

18 Claims, 6 Drawing Sheets

TRANSMISSION APPARATUS

BACKGROUND OF THE INVENTION

1. Field of the Invention

The present invention relates to a transmission apparatus for transmitting power. More specifically, the present invention relates to a transmission apparatus for transmitting power from a motor for driving an airport ground support tractor.

2. Background Information

In the operation of an airport, passenger luggage and the like must be transported from the departure terminal to the aircraft to be loaded. Similarly, at the arrival terminal, planes must be unloaded and the luggage therefrom must be efficiently transported to the arrival terminal.

Accordingly, most terminals are provided with a fleet of tractors for hauling a train of luggage trailers between the planes and the terminals.

However, when the luggage trailers are loaded, a relatively low gear ratio is required in order to haul the heavy load. When the luggage trailers have been unloaded, pulling the unloaded trailers can be accomplished using a relatively high gear ratio so that the tractor can rapidly return for reloading.

Although manual two speed gearbox arrangements have been provided, such manual two speed gearboxes are subject to rapid wear. Also, such two speed gearboxes must be provided with a reverse gear ratio for permitting maneuvering of the tractor.

The present invention overcomes the rapid wear problems associated with the prior art two speed manual gearbox arrangements while avoiding the excessive cost involved in the provision of a conventional fully automatic gear transmission.

Accordingly, the present invention provides a unique combination of a simplified automatic transmission for providing forward and reverse movement while including a semi manual two speed gearbox having a low gear ratio for pulling heavy loads and a relatively high gear ratio for a rapid return to a luggage loading station.

Therefore, the primary feature of the present invention is the provision of a transmission apparatus that overcomes the problems associated with the prior art transmission arrangements and which makes a significant contribution to the tractor power transmission art.

Another feature of the present invention is the provision of a transmission apparatus that reduces the rapid wear problem associated with known manual gearboxes while avoiding the excessive cost of providing a fully automatic conventional transmission.

Other features and advantages of the present invention will be readily apparent to those skilled in the art by a consideration of the detailed description of a preferred embodiment of the present invention contained herein.

SUMMARY OF THE INVENTION

The present invention relates to a transmission apparatus for transmitting power from a motor for driving an airport ground support tractor. The transmission apparatus includes a housing which has an input end and an output end, the housing defining a transmission enclosure. A torque converter is disposed within the housing, the torque converter having an input which is driven by the motor and an output for transmitting torque from the motor. An input shaft is rotatably supported within the housing, the input shaft having a first and a second extremity. The first extremity of the input shaft is driven by the output from the torque converter.

A planetary gear train intermeshes with the input shaft, the gear train being disposed between the first and second extremities of the input shaft. A planetary gear train support is provided for rotatably supporting the planetary gear train. A casing is disposed coaxially relative to the input shaft, the casing intermeshing with the gear train so that when the input shaft is being rotated in a first rotational direction, the casing is selectively able to rotate in a second rotational direction which is opposite to the first rotational direction.

The planetary gear train is structured such that, in a first mode of operation, the input shaft, the casing and the planetary gear train support are rotated in the first rotational direction, for moving the tractor forwardly.

However, in a second mode of operation, when the input shaft is rotated in the first rotational direction, rotation of the casing relative to the housing is inhibited so that the planetary gear train support rotates in the second rotational direction and the tractor moves rearwardly.

A main shaft has a driven end and a driving end, the main shaft being rotatably supported by the housing. The arrangement is such that the driven end of the main shaft is secured to the planetary gear train support so that the support selectively drives the main shaft in the first rotational direction and the second rotational direction.

An output shaft has a first end and a second end. The output shaft is rotatably supported by the housing such that the output shaft is disposed coaxially relative to the main shaft so that the output shaft is selectively driven by the driving end of the main shaft. A first gear wheel defines a splined bore, the splined bore intermeshing with an external spline defined by the main shaft. The arrangement is such that, when the main shaft is rotating, the external spline and the intermeshing splined bore cooperate for rotating the first gear wheel.

A lay shaft is disposed within the transmission enclosure, the lay shaft having a longitudinal axis disposed spaced and parallel relative to a rotational axis of the main shaft. A gear assembly is disposed within the enclosure such that the gear assembly is supported by the lay shaft for rotation thereof about the longitudinal axis. The gear assembly defines a driven gear and a driving gear which is disposed axially relative to the driven gear. The driven gear intermeshes with the first gear wheel such that, when the first gear wheel rotates about the rotational axis of the main shaft, the intermeshing driven gear is rotated about the longitudinal axis of the lay shaft for rotating the gear assembly including the driving gear. A second gear wheel intermeshes with the driving gear, the second gear wheel defining a bore for the rotatable reception therein of the output shaft.

A synchro device is operably disposed between the first and second gear wheels such that, in a first disposition of the synchro device, the motor rotates the main shaft which drives the first gear wheel for rotating the gear assembly for rotating the second gear wheel. The synchro device drivingly connects the second gear wheel to the output shaft so that a first gear ratio is established between the input and the output shafts. In a second disposition of the synchro device, the motor rotates the main shaft and the synchro device drivingly connects the main shaft to the output shaft and disconnects the second gear wheel from driving connection to the output shaft so that a second gear ratio is established between the input and the output shafts.

An electro-hydraulic actuator is operatively connected to the synchro device for selectively moving the synchro device between the first and second dispositions thereof for selectively establishing the first and second gear ratios.

In a more specific embodiment of the present invention, the housing includes a bell housing having a first and a second extremity. The first extremity of the bell housing defines a flange for mounting the bell housing to the motor.

Moreover, the bell housing has an extension which extends from the first extremity for receiving a starting motor.

Also, a main housing has a first and a second end, the first end of the main housing being secured to the second extremity of the bell housing.

Furthermore, an output housing has a front end and a rear end. The front end of the output housing is secured to the second end of the main housing such that the main housing is disposed between the bell housing and the output housing.

Additionally, the planetary gear train includes a plurality of pairs of cylindrical gears. Each cylindrical gear of the plurality of pairs of gears is disposed between the input shaft and the casing. The arrangement is such that for each pair of gears, one of the gears intermeshes with the input shaft and the other gear of the pair of gears intermeshes with an internal gear ring defined by the casing. Also, each gear of a pair of gears intermeshes with an adjacent gear of that pair of gears.

A reversing mechanism is associated with the casing. The reversing mechanism includes an electronic control for selecting the first and the second modes of operation. The arrangement is such that in the first mode of operation, the tractor moves forwardly and in the second mode of operation, the tractor moves rearwardly. The electronic control is operably connected to a pressurized hydraulic source disposed within the transmission enclosure.

Further, a forward clutch includes a chamber defined by the housing. The chamber is in fluid communication with the pressurized hydraulic source and operably connected to the electronic control such that, in the first mode of operation the chamber is connected to the source of hydraulic pressure for urging a plurality of clutch plates against the casing such that the casing rotates together with the input shaft so that the tractor moves forwardly.

Also, a reverse clutch includes a piston which is slidably disposed within a further chamber such that when the further chamber is connected to the source of hydraulic pressure, the piston is moved axially along the further chamber.

More specifically, in the second mode of operation, which is the reverse mode, when the forward clutch has been disengaged, hydraulic pressure moves the piston along the further chamber for urging further clutch plates against the casing for inhibiting rotation of the casing relative to the housing so that the tractor moves rearwardly.

Moreover, when both the forward clutch and the reverse clutch are disengaged, the input shaft rotates the planetary gear chain so that the casing rotates in the second rotational direction and the gear train support does not rotate relative to the housing. Consequently, a neutral mode is established in which the tractor moves neither forwardly nor rearwardly.

Moreover, a valve is disposed in fluid communication with the chamber and further chamber for limiting pressure applied to the clutch plates and further clutch plates.

Additionally, the planetary gear train support includes a plurality of pinions, each pinion extending through and rotatably supporting a cylindrical gear of the planetary gear train.

Moreover, in the first mode of operation, which is the forward mode, the casing rotates together with the input shaft. However, in the second or reverse mode of operation, the casing is prevented from rotating relative to the housing due to the further clutch plates locking the casing against such rotational movement.

Further, a driven end of the main shaft defines a flange, the flange defining a plurality of holes for the reception therein of the pinions of the planetary gear train support so that the pinions are secured to the flange adjacent to a periphery of the flange.

The synchro device includes a slider ring which is disposed coaxially relative to the first gear wheel. The slider ring defines an annular groove such that, when the slider ring is moved axially relative to the main shaft, the slider ring moves axially along the output shaft for selectively connecting the first or second gear wheel to the output shaft. The arrangement is structured such that in the first disposition, the first gear wheel drives the output shaft via the gear assembly. However, in the second disposition, the slider ring is moved axially for drivingly connecting the second gear wheel to the output shaft. Additionally, the synchro device includes synchronizing cones for selectively synchronizing transmission of power from the output shaft through the second gear wheel in the first disposition and through the first gear wheel in the second disposition.

Also, the actuator includes an actuator arm which is disposed within the housing. The actuator arm rides within the annular groove so that, when the actuator arm is moved axially relative to the main shaft, the slider ring is moved axially along the output shaft for selectively establishing the first and second gear ratios.

More particularly, the actuator includes a slave piston slidably disposed within a cavity defined by the housing such that the slave piston separates the cavity into a first and second compartment respectively.

The slave piston is secured to the actuator arm such that when the slave piston moves within and axially along the cavity, the actuator arm moves the slider ring for selectively engaging the first and second gear ratios.

Additionally, the actuator includes an electro magnetic solenoid. A servo valve is secured to the solenoid, the servo valve being connected to the source of hydraulic pressure such that, when the solenoid is energized, the solenoid and servo valve secured thereto moves axially from a first to a second location thereof. The arrangement is such that, when the servo valve is disposed in the first location thereof, the source of hydraulic pressure is connected to the first compartment. However, when the servo valve is disposed in the second location thereof, the source of hydraulic pressure is connected to the second compartment. The arrangement is such that, when the solenoid is energized, the slider ring is moved axially along the output shaft so that the transmission apparatus engages the second gear ratio.

More specifically, the actuator includes a pressure relief device which is disposed within the slave piston. The arrangement is such that, when a maximum permissible hydraulic pressure is reached within the second compartment, the pressure relief device opens to inhibit over pressurizing the second compartment so that a smooth transition between gear ratios is attained.

A sensor is provided for sensing a rate of rotation of the input shaft. Also, a further sensor is provided for sensing a rate of rotation of the output shaft.

Also, the electronic control is electrically connected to the sensors for analyzing input from the sensors and for generating an output signal for controlling energizing of the electro magnetic solenoid.

In the present application, the term airport ground support tractor includes a tractor for pulling luggage trailers, food supply trailers, trailers carrying aircraft repair tools and equipment, trailers for mail and air packages, fuel tankers and the like and tractors for moving aircraft away from departure terminals.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
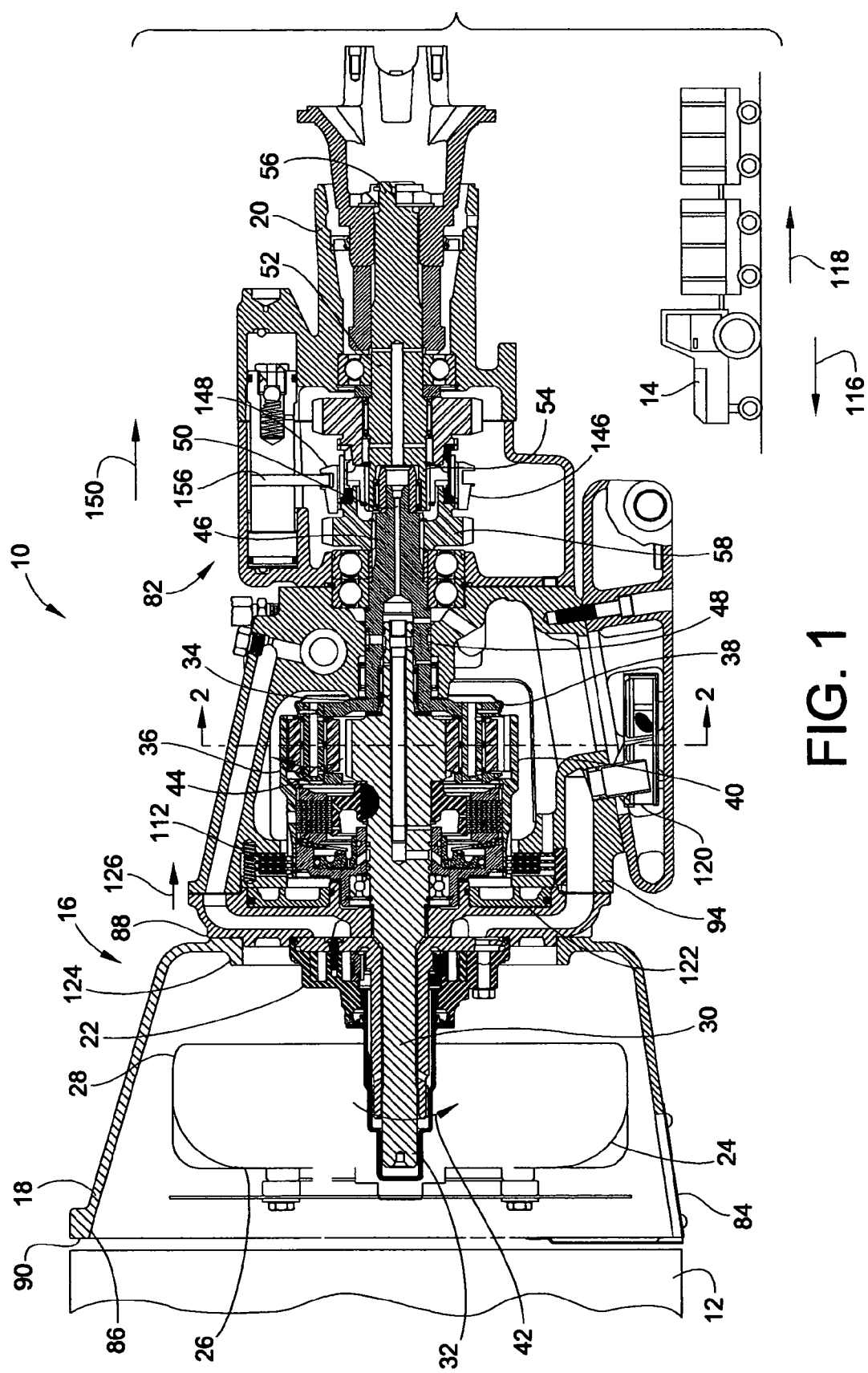
FIG. 1 is a side sectional view of a transmission apparatus according to the present invention.

FIG. 1 is a side sectional view of a transmission apparatus generally designated 10 according to the present invention. As shown in FIG. 1, the transmission apparatus 10 is for transmitting power from a motor 12 for driving an airport ground support tractor 14 shown representatively in a smaller scale. The transmission apparatus 10 includes a housing generally designated 16 which has an input end 18 and an output end 20, the housing 16 defining a transmission enclosure 22.

A torque converter 24 is disposed within the housing 16, the torque converter 24 having an input 26 driven by the motor 12 and an output 28 for transmitting torque from the motor 12.

An input shaft 30 is rotatably supported within the housing 16, the input shaft 30 having a first and a second extremity 32 and 34 respectively. The first extremity 32 of the input shaft 30 is driven by the output 28 from the toque converter 24. A planetary gear train generally designated 36 intermeshes with the input shaft 30, the gear train 36 being disposed between the first and second extremities 32 and 34 respectively of the input shaft 30. A planetary gear train support generally designated 38 rotatably supports the planetary gear train 36. A casing 40 is disposed coaxially relative to the input shaft 30, the casing 40 intermeshing with the gear train 36 to be described in more detail. The input shaft 30 is always rotated in a first rotational direction, as indicated by the arrow 42.

Figure 2:
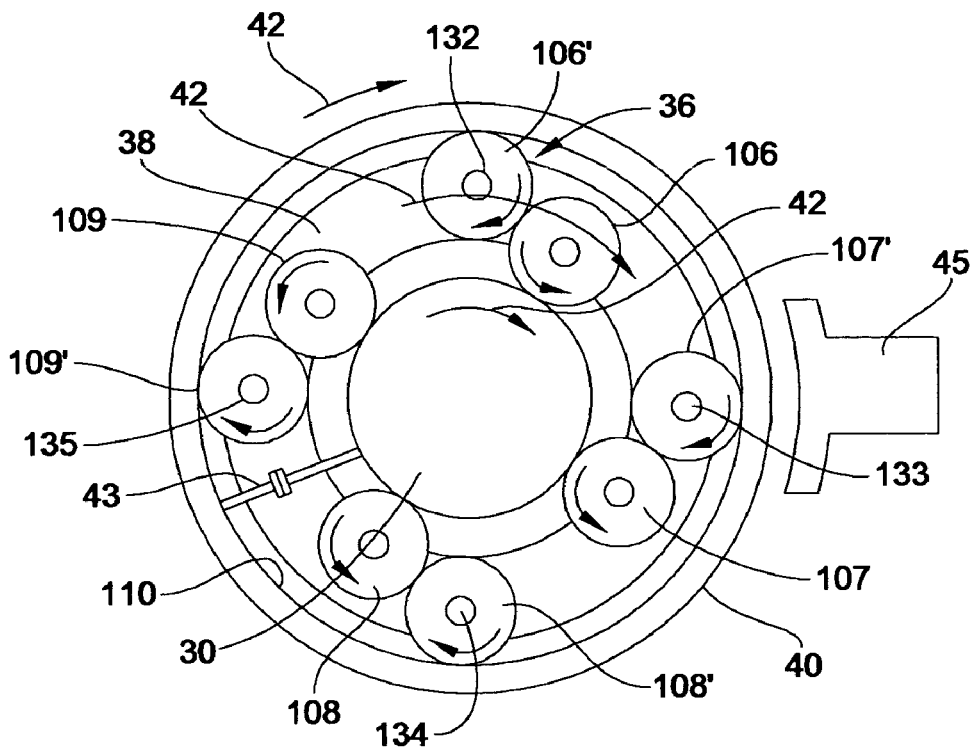
FIG. 2 is an enlarged sectional view taken on the line 2-2 of FIG. 1.

FIG. 2 is an enlarged sectional view taken on the line 2-2 of FIG. 1. As shown in FIG. 2, the planetary gear train 36 is structured such that in a forward first mode of operation, the input shaft 30 is rotated in the first rotational direction 42. As shown schematically in FIG. 2, a forward clutch 43, to be described later, when engaged, as shown in FIG. 2, causes the casing 40 to be rotated by the input shaft 30 so that the casing 40 rotates in the first rotational direction 42. In the first mode of operation, the planetary gear train support 38 rotates in the first rotational direction 42. Accordingly, in the first mode of operation, the tractor moves forwardly as indicated by the arrow 116 shown in FIG. 1.

Figure 3:
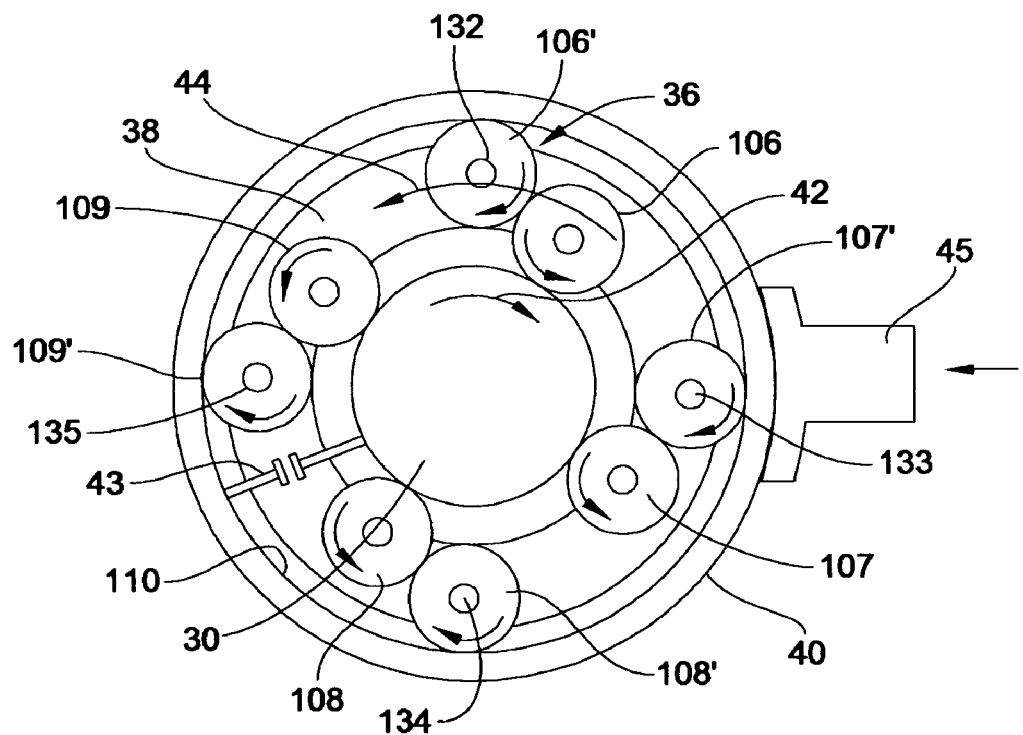
FIG. 3 is a similar view to that shown in FIG. 2 but shows the planetary gear train in a second mode of operation.

FIG. 3 is a similar view to that shown in FIG. 2 but illustrates the planetary gear train 36 in a second mode of operation which is a reverse mode. As shown in FIG. 3, the input shaft 30 is rotated in the first rotational direction 42. However, when a reverse clutch 45, to be described in more detail later, is engaged and the forward clutch 43 is disengaged, rotation of the casing 40 relative to the housing 16 is inhibited as illustrated schematically by the reverse clutch 45 stopping rotation of the casing 40. Accordingly, in the second mode of operation, as shown in FIG. 3, the input shaft 30 rotates in the first rotational direction 42. However, because the casing 40 is held against rotation by the reverse clutch 45, the planetary gears 36 will cause the planetary gear support 38 to rotate in a second rotational direction 44 which is opposite to the first rotational direction 42. Accordingly, the support 38 will rotate in a reverse direction 44 relative to the input shaft 30 so that the tractor moves rearwardly as indicated by the arrow 118 shown in FIG. 1.

As shown in FIG. 1, a main shaft 46 has a driven end 48 and a driving end 50, the main shaft 46 being rotatably supported by and within the housing 16. The arrangement is such that the driven end 48 of the main shaft 46 is secured to the planetary gear train support 38 so that the support 38 selectively drives the main shaft 46 in the forward first rotational direction 42 and the reverse second rotational direction 44.

An output shaft 52 has a first end 54 and a second end 56. The output shaft 52 is rotatably supported by and within the housing 16 such that the output shaft 52 is disposed coaxially relative to the main shaft 46 so that the output shaft 52 is driven by the driving end 50 of the main shaft 46.

Figure 4:
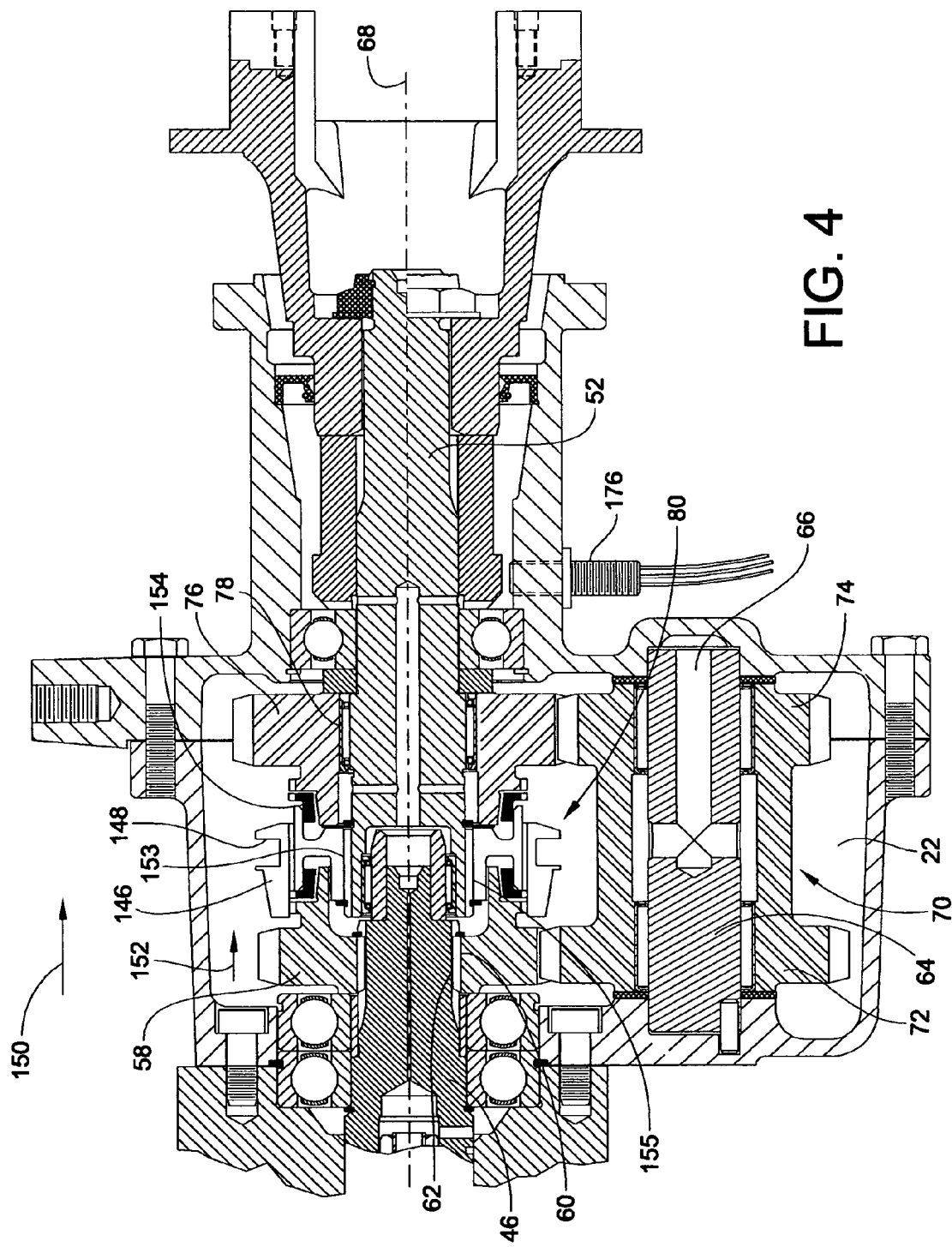
FIG. 4 is an enlarged view of the main shaft shown in FIG. 1.

FIG. 4 is an enlarged view of the main shaft 46. As shown in FIG. 4, a first gear wheel 58 defines a splined bore 60, the splined bore 60 intermeshing with an external spline 62 defined by the main shaft 46. The arrangement is such that, when the main shaft 46 is rotating, the external spline 62 and intermeshing splined bore 60 cooperate for rotating the first gear wheel 58. A lay shaft 64 is disposed within the transmission enclosure 22, the lay shaft 64 having a longitudinal axis 66 which is disposed spaced and parallel relative to a rotational axis 68 of the main shaft 46. A gear assembly generally designated 70 is disposed within the transmission enclosure 22 such that the gear assembly 70 is supported by the lay shaft 64 for rotation thereof about the longitudinal axis 66. The gear assembly 70 defines a driven gear 72 and a driving gear 74 which is disposed axially relative to the driven gear 72. The driven gear 72 intermeshes with the first gear wheel 58 such that, when the first gear wheel 58 rotates about the rotational axis 68 of the main shaft 46, the intermeshing driven gear 72 is rotated about the longitudinal axis 66 of the lay shaft 64 for rotating the gear assembly 70 including the driving gear 74. A second gear wheel 76 intermeshes with the driving gear 74, the second gear wheel 76 defining a bore 78 for the rotatable reception therein of the output shaft 52.

A synchro device generally designated 80 is operably disposed between the first and second gear wheels 58 and 76 respectively such that, in a first disposition of the synchro device 80, the motor 12 rotates the main shaft 46 which drives the first gear wheel 58 for rotating the gear assembly 70 for rotating the second gear wheel 76. The synchro device 80 drivingly connects the second gear wheel 76 to the output shaft 52 so that a first gear ratio is established between the main shaft 46 and the output shaft 52.

In a second disposition of the synchro device 80, the motor 12 rotates the main shaft 46 and the synchro device 80 drivingly connects the main shaft 46 to the output shaft 52 and disconnects the second gear wheel 76 from a driving connection to the output shaft 52 so that a second gear ratio is established between the main shaft 46 and the output shaft 52.

As shown in FIG. 1, an electro-hydraulic actuator generally designated 82 is operatively connected to the synchro device 80 for selectively moving the synchro device 80 between the first and second dispositions thereof for selectively establishing the first and second gear ratios.

As shown in FIG. 1, the housing 16 includes a bell housing 84 having a first and a second extremity 86 and 88 respectively. The first extremity 86 of the bell housing 84 defines a peripheral flange 90 for mounting the bell housing 84 to the motor 12.

Figure 5:
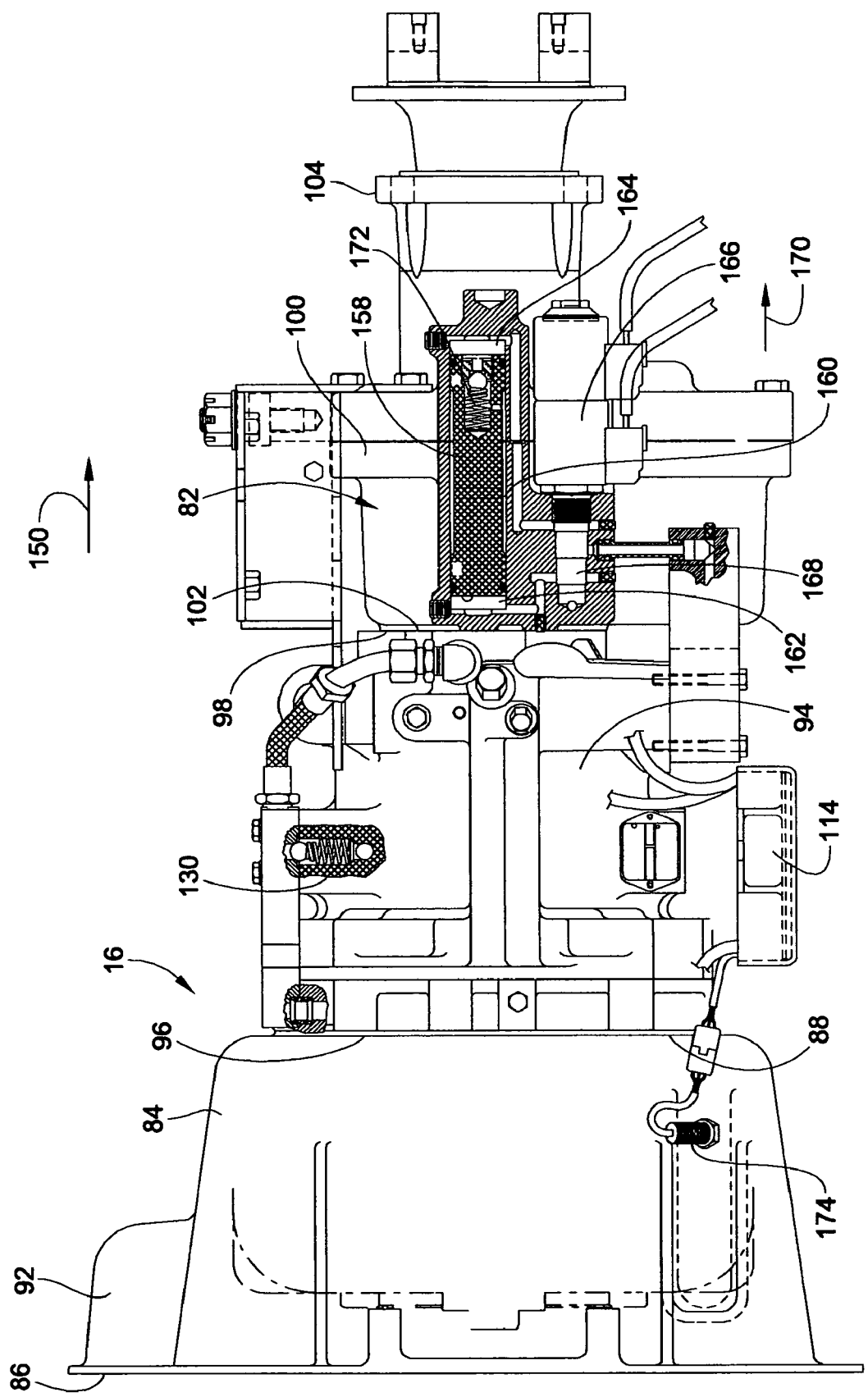
FIG. 5 is a top plan view of the transmission apparatus shown in FIG. 1.

FIG. 5 is a top plan view of the transmission apparatus 10 shown in FIG. 1. As shown in FIG. 5, the bell housing 84 has an extension 92 which extends from the first extremity 86 for receiving a starting motor (not shown).

As shown in FIGS. 1 and 5, the housing 16 also includes a main housing 94 having a first and a second end 96 and 98 respectively, the first end 96 of the main housing 94 being secured to the second extremity 88 of the bell housing 84.

Additionally, as shown in FIG. 5, the housing 16 includes an output housing 100 having a front end 102 and a rear end 104. The front end 102 of the output housing 100 is secured to the second end 98 of the main housing 94 such that the main housing 94 is disposed between the bell housing 84 and the output housing 100.

As shown in FIG. 2, the planetary gear train 36 includes a plurality of pairs of cylindrical gears 106 and 106', 107 and 107', 108 and 108', 109 and 109'. Each pair of cylindrical gears such as gears 106 and 106' is disposed between the input shaft 30 and the casing 40 such that the cylindrical gears 106 to 109 intermesh with the input shaft 30. The gears 106 to 109 also intermesh respectively with gears 106' to 109'. Gears 106' to 109' also intermesh with an internal gear ring 110 defined by the casing 40. Consequently, as shown in FIG. 2, the input shaft 30 rotates clockwise while gear 106 rotates counterclockwise and gear 106' rotates clockwise. Therefore, when both forward clutch 43 and reverse clutch 45 are disengaged, the casing will rotate clockwise and the planetary gear train support 38 will not rotate relative to the housing 16. Thus a neutral mode will be established in which the support 38 and main shaft 46 are not rotated. Therefore, the tractor in the neutral mode will not move forwardly or rearwardly.

As shown in FIG. 1, a reversing mechanism generally designated 112 is associated with the casing 40.

As shown in FIG. 5, the reversing mechanism 112 includes an electronic control 114 for selecting the first and the second mode of operation.

As shown in FIG. 1, the arrangement is such that in the first, that is forward mode of operation, as shown in FIG. 2, the tractor 14 moves forwardly as indicated by the arrow 116 and in the second mode of operation, as shown in FIG. 3, the tractor 14 moves rearwardly as indicated by the arrow 118. The electronic control 114 is operatively connected to a source of hydraulic pressure 120 such as a crescent gear type oil pump disposed within the enclosure 22.

Figure 6:
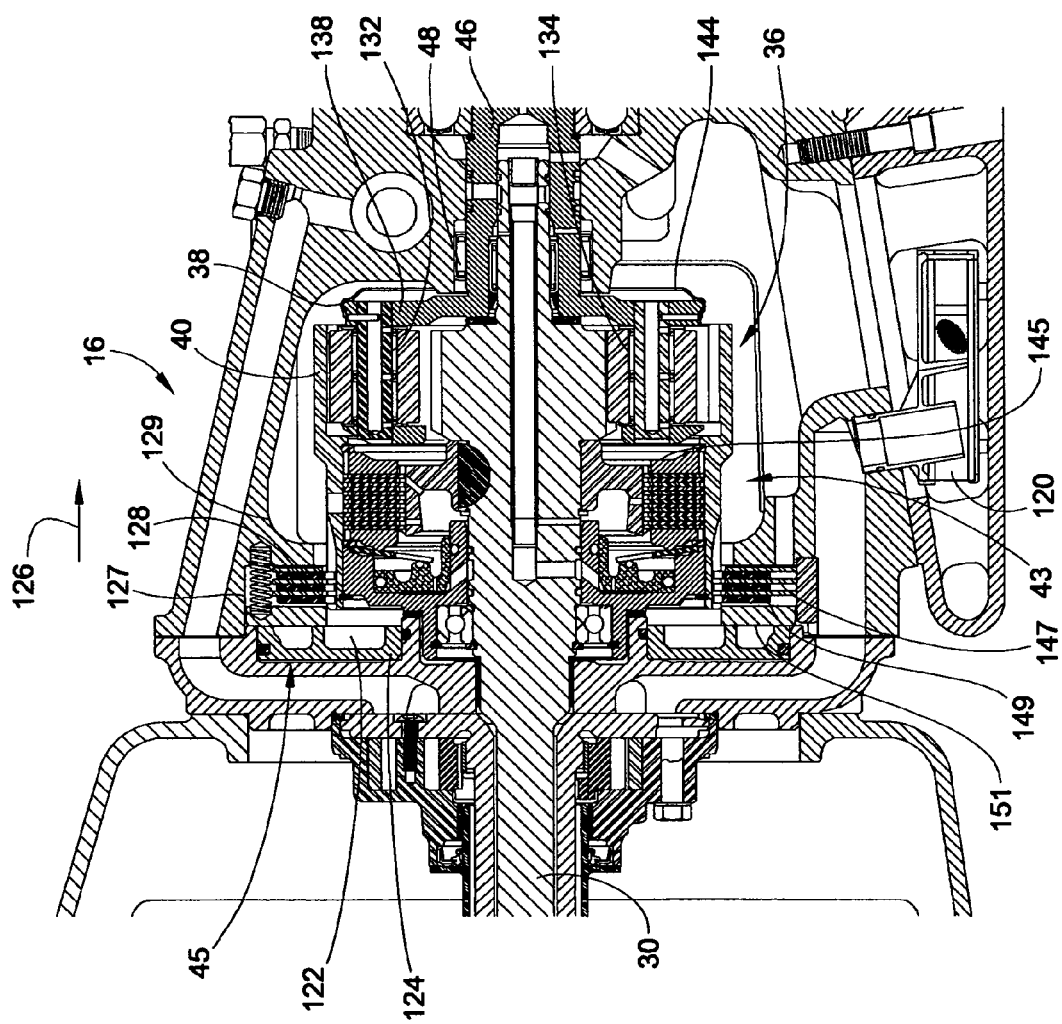
FIG. 6 is an enlarged fragmentary view of the gear train shown in FIG. 1.

FIG. 6 is an enlarged fragmentary view of the gear train 36 shown in FIGS. 1, 2 and 3. As shown in FIG. 6, the forward clutch 43 includes a chamber 145 which is selectively connected to the pressurized hydraulic source 120 so that when the chamber 145 is connected to the pressurized hydraulic source 120, clutch plates 147, 149 and 151 are urged against the casing 40 so that the casing 40 rotates together with the input shaft 30 so that the tractor 14 moves forwardly as indicated by the arrow 116 shown in FIG. 1.

Also, as shown in FIG. 6, the reverse clutch 45, shown schematically in FIG. 3, includes a further chamber 122 which is defined by the housing 16. The further chamber 122 is selectively in fluid communication with the source of hydraulic pressure 120 such that, in the reverse, second mode of operation, the further chamber 122 is connected to the source of hydraulic pressure. More specifically, a piston 124 is slidably disposed within the further chamber 122 such that, in the reverse second mode of operation, when the further chamber 122 is connected to the source of hydraulic pressure 120, the piston 124 is moved axially along the chamber 122 as indicated by the arrow 126.

A plurality of further clutch plates 127, 128 and 129 are disposed between the piston 124 and the casing 40 such that, in the reverse second mode of operation as shown in FIG. 3, hydraulic pressure moves the piston 124 along the chamber 122 as indicated by the arrow 126 for urging the clutch plates 127 to 129 against the casing 40 for inhibiting rotation of the casing 40 relative to the housing 16 so that the tractor 14 moves rearwardly as indicated by the arrow 118 shown in FIG. 1.

Consequently, when the forward clutch 43 is engaged and the reverse clutch 45 is disengaged, the tractor moves forwardly and when the reverse clutch 45 is engaged and the forward clutch 43 is disengaged, the tractor moves rearwardly. However, when both the forward clutch 43 and the reverse clutch 45 are disengaged, the neutral mode will be generated in which the tractor remains stationary.

The electronic control 114 generates a signal for a delayed control of the synchro device 80 such that the synchro device 80 is operated in response to engagement and disengagement of the reverse clutch plates 127 to 129 and the forward clutch plates 147, 149 and 151 so that time is permitted for selection of the required gear ratio.

As shown in FIG. 5, a pressure relief valve 130 is disposed in fluid communication with the further chamber 122 for limiting pressure applied to the piston 124 so that movement of the tractor 14 in the rearward direction 118 is accomplished smoothly. The valve 130 is also connected to the chamber 145 so that movement of the tractor 14 in the forward direction 116 is also accomplished smoothly.

As shown in FIG. 6, the planetary support 38 includes a plurality of pinions 132, 133, 134 and 135.

As shown in FIG. 2, each pinion such as pinion 132 of the plurality of pinions 132 to 135 extends through and rotatably supports respectively a cylindrical gear 106' to 109' of the planetary gear train 36.

Moreover, in the first mode of operation as shown in FIG. 2, the forward clutch 43 is engaged so that the casing 40 rotates together with the input shaft 30. However, as shown in FIG. 3, in the second or reverse mode of operation, the casing 40 is prevented from rotation relative to the housing 16 due to the pressure applied through the further clutch plates 127 to 129 shown in FIG. 6, so that the casing 40 is locked from rotational movement relative to the housing 16.

Further, as shown in FIG. 6, the driven end 48 of the main shaft 46 defines a flange 138. The flange 138 defines a plurality of holes for the reception therein of the pinions 132 to 135 respectively of the planetary gear train support 38 so that the pinions 132 to 135 are secured to the flange 138 adjacent to a periphery 144 of the flange 138.

As shown in FIG. 4, the synchro device 80 includes a slider ring 146 which is connected to and which is disposed coaxially relative to the first gear wheel 58. The slider ring 146 defines an annular groove 148 such that when the slider ring 146 is moved axially relative to the output shaft 52 as indicated by the arrow 150, the slider ring 146 is moved axially along the output shaft 52 as indicated by the arrow 152 The slider ring 146 defines a further splined bore 153 which cooperates with a corresponding further external spline 155 defined by the output shaft 52 so that regardless of the axial disposition of the slider ring 146, the further splined bore 153 always intermeshes with the further external spline 155 of the output shaft 52. The arrangement is structured such that, in the first disposition, with the slider ring 146 moved to the right as viewed in FIG. 4, the first gear wheel 58 drives the output shaft 52 via the gear assembly 70. However, in the second disposition, with the slider ring 146 moved to the left as viewed in FIG. 4, the slider ring 146 is moved to the left axially along the output shaft 52 so that the first gear wheel 58 is connected to the output shaft 52 via the further splined bore 153 of the slider ring 146 and the cooperating external spline 155 of the output shaft 52 for driving the output shaft 52.

Additionally, the synchro device 80 includes synchronizing cones 154 for selectively synchronizing transmission to the output shaft 52 from the second gear wheel 76 in the first disposition and from the first gear wheel 58 in the second disposition.

As shown in FIG. 1, the electro hydraulic actuator 82 includes an actuator arm 156 which is disposed within the housing 16. The actuator arm 156 rides within the annular groove 148 so that when the actuator arm 156 is moved axially relative to the main shaft 46 as indicated by the arrow 150, the slider ring 146 is moved axially along the output shaft 52 as indicated by the arrow 152 shown in FIG. 4 for selectively establishing the first and second gear ratios.

More particularly, as shown in FIG. 5, the actuator 82 includes a slave piston 158 slidably disposed within a cavity 160 such that the slave piston 158 separates the cavity 160 into a first and second compartment 162 and 164 respectively.

The slave piston 158 is secured to the actuator arm 156 as shown in FIG. 1, such that when the slave piston 158 moves within and axially along the cavity 160 as indicated by the arrow 150, the actuator arm 156 moves the slider ring 146 for selectively engaging the first and second gear ratios.

Additionally, as shown in FIG. 5, the actuator 82 includes an electro magnetic solenoid 166. A servo valve 168 is secured to the solenoid 166, the servo valve 168 being connected to the source of hydraulic pressure 120 shown in FIG. 1. The arrangement is such that, when the solenoid 166 is energized, the solenoid 166 and the servo valve 168 secured thereto moves axially from a first to a second location thereof, as indicated by the arrow 170. The arrangement is such that, when the servo valve 168 is disposed in the first location thereof, the hydraulic pressure source 120 is connected to the first compartment 162 and when the servo valve 168 is disposed in the second location thereof, the hydraulic pressure source 120 is connected to the second compartment 164. Accordingly, when the solenoid 166 is energized, the slider ring 146 is moved axially along the output shaft 52 as shown in FIG. 4 and as indicated by the arrow 152 so that the transmission apparatus 10 operatively changes between the first to the second gear ratio.

More specifically, the actuator 82 includes a pressure relief device 172 which is disposed within the slave piston 158. The arrangement is such that, when a maximum permissible hydraulic pressure is reached within the second compartment 164, the pressure relief device 172 opens for inhibiting over pressurizing of the second compartment 164 so that a smooth transition between gear ratios is attained.

As shown in FIG. 5, a sensor 174 is provided for sensing a rate of rotation of the input shaft 30.

Also, as shown in FIG. 4, a further sensor 176 or tailstock sensor is provided for sensing a rate of rotation of the output shaft 52.

Figure 7:
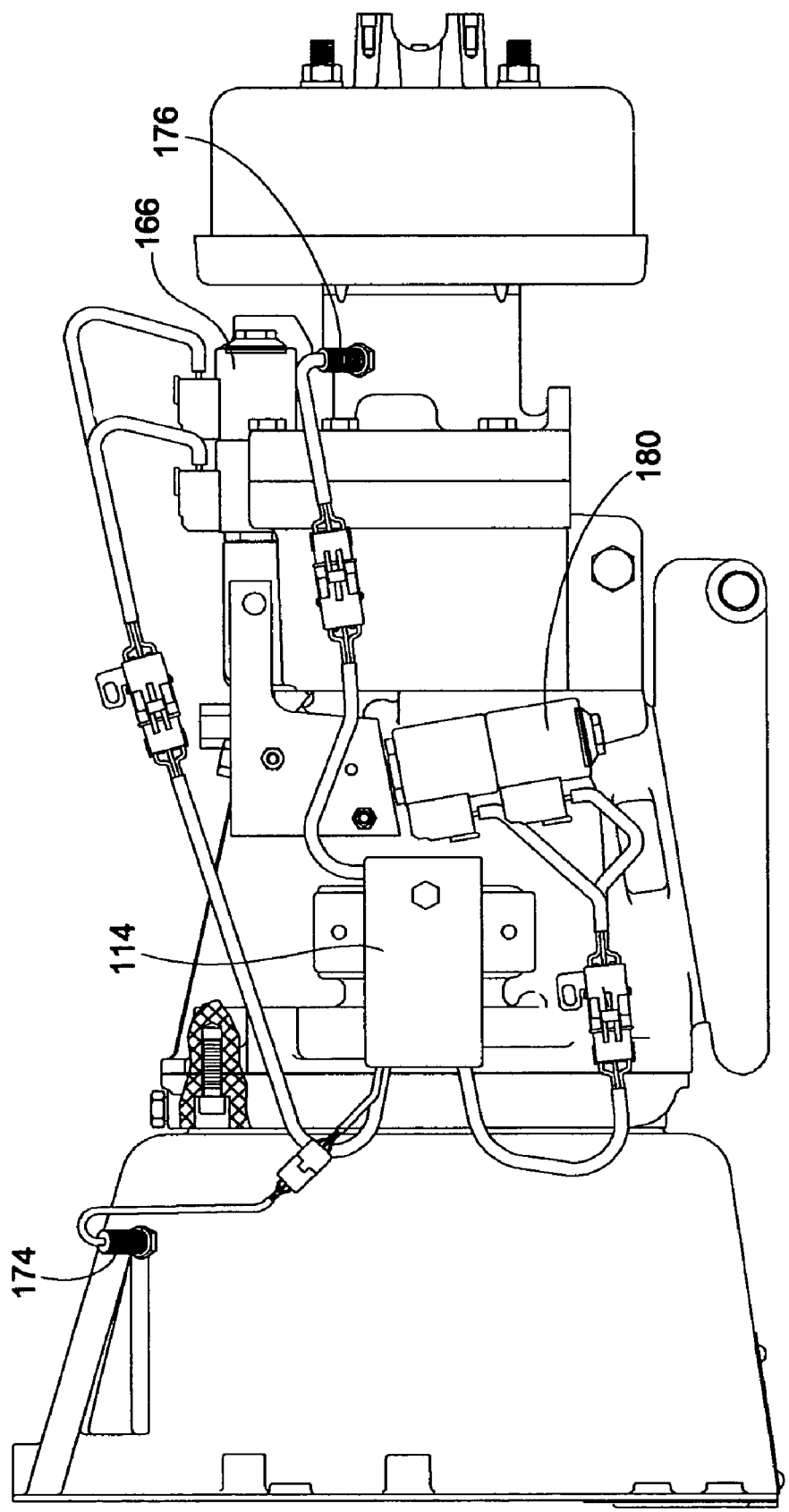
FIG. 7 is a side elevational view of the transmission apparatus shown in FIG. 1.

FIG. 7 is a side elevational view of the transmission apparatus 10 shown in FIG. 1. As shown in FIG. 7, the electronic control 114 is electrically connected to the sensors 174 and 176 for analyzing input from the sensors 174 and 176 and for generating an output signal for controlling the energizing of the electro magnetic solenoid 166.

Also, as shown in FIG. 7, a further solenoid and spool type valve generally designated 180 are provided for selectively controlling fluid connection of the source of hydraulic pressure 120 with the further chamber 122 for engaging the forward and reversing mode of operation.

In operation of the transmission apparatus 10, when the tractor 14 is to be driven forwardly, the motor 12 is started so that the motor 12 drives the torque convertor 24. As the rotational speed of the motor 12 is increased, the output 28 from the torque convertor 24 will rotate the input shaft 30. Rotation of the input shaft 30 together with the cooperating planetary gear train 36 will rotate the casing 40 while the forward and reverse clutches 43 and 45 respectively are disengaged. However, when the forward clutch 43 is engaged, the casing 40 will be connected by the forward clutch 43 for rotating the casing 40 in the forward first rotational direction 42 so that the flange 138 of the main shaft 46 will be driven in the first rotational direction 42 so that the tractor 14 will move forwardly.

However, when an operator wishes to reverse the tractor, the operator selects reverse and the electronic control 114, connects the source of hydraulic pressure 120 to the further chamber 122 so that the piston 124 moves for urging the clutch plates 127 to 129 against the casing 40 so that rotation of the casing 40 relative to the housing 16 is prevented. Consequently, the gear train 36 now rotates the flange 138 in the second rotational direction 44 for reversing the tractor 14.

For the first gear ratio, which is used for pulling heavy luggage loads, the output shaft 52 is driven by the second gear wheel 76. In a preferred embodiment of the present invention, the first gear wheel 58 defines 27 gear teeth which intermesh with 28 gear teeth defined by the driven gear 72.

Furthermore, the driving gear 74 defines 24 gear teeth which intermesh with 34 gear teeth defined by the second gear wheel 76 thus providing a relatively low gear ratio suitable for pulling heavy loads.

However, when the luggage load has been delivered or when the tractor is able to move at a higher ground speed, the second gear ratio is automatically selected so that the unloaded tractor can move at a higher speed. Accordingly, the operator operates the electronic control 114 for selecting forward or reverse. Thereafter, the control 114 energizing the solenoid 166 so that the actuator arm 156 moves the slider ring 146 for directly driving the output shaft 52 through engagement of the second gear ratio. When the second gear ratio is selected, the output shaft 52 is rotated at the same rate of rotation as the main shaft 46.

Nevertheless, if the higher gear ratio were to engage when pulling a heavy load, a comparison of the input from the sensors 174 and 176 is received by the electronic control 114. Accordingly, an electrical signal is generated within the electronic control 114 for automatically selecting the first lower gear ratio thereby reducing the possibility of the tractor stalling under excessive load.

The electronic control 114 includes an electronic control module (ECM) such that when switching while in the higher gear ratio, the ECM will wait for a down shift and will then not permit an up shift. Also, if in a low gear ratio and the transmission were to switch to a high ratio, the engine RPM's need to be below the shift RPM before the transmission is permitted to shift.

Additionally, the shifter must be in neutral to start. Furthermore, when the shifter is moved to forward, the engine must be rotating at less than 1500 RPM and the rear tailstock sensor must register 0 MPH.

Similarly, when the shifter is in reverse, the engine must be rotating at less than 1500 RPM. and the rear tailstock sensor must register 0 MPH.

At a tractor speed of 7 MPH, the transmission is shifted out of forward for 350 ms and is shifted into the higher gear ratio for 250 to 450 ms. Then, it is shifted into forward proportionately over the course of 1 second.

At a tractor speed of 4 MPH, the transmission is shifted out of forward for 750 ms and is then shifted into the low gear ratio for 750 ms. Thereafter, it is shifted into forward proportionately over the course of 1 second.

The present invention provides a unique transmission apparatus which incorporates the advantages of a simplified automatic transmission with a selective two speed gear box for a luggage transporting tractor.

What is claimed is:

1. A transmission apparatus for transmitting power from a motor for driving an airport ground support tractor, said transmission apparatus comprising:
   a housing having an input end and an output end, said housing defining a transmission enclosure;
   a torque converter disposed within said housing, said torque converter having an input driven by the motor and an output for transmitting torque from the motor;
   an input shaft rotatably supported within said housing, said input shaft having a first and a second extremity, said first extremity of said input shaft being driven by said output from said torque converter;
   a planetary gear train intermeshing with said input shaft, said gear train being disposed between said first and second extremities of said input shaft;
   a planetary gear train support for rotatably supporting said planetary gear train;
   a casing disposed coaxially relative to said input shaft, said casing intermeshing with said gear train, said input shaft being rotated in a first rotational direction;
   said planetary gear train being structured such that in a first mode of operation, when said input shaft is rotated in said first rotational direction, said planetary gear train support is rotated in said first rotational direction and in a second mode of operation, when said input shaft is rotated in said first rotational direction, rotation of said casing relative to said housing is inhibited so that said planetary gear train support rotates in a second rotational direction opposite to said first rotational direction;
   a main shaft having a driven end and a driving end, said main shaft being rotatably supported by said housing such that said driven end of said main shaft is secured to said planetary gear train support so that said planetary gear train support selectively drives said main shaft in said first rotational direction and said second rotational direction;
   an output shaft having a first end and a second end, said output shaft being rotatably supported by said housing such that said output shaft is disposed coaxially relative to said main shaft so that said output shaft is selectively driven by said driving end of said main shaft;
   a first gear wheel defining a splined bore, said splined bore intermeshing with an external spline defined by said main shaft so that when said main shaft is rotating, said external spline and intermeshing splined bore cooperate for rotating said first gear wheel;
   a lay shaft disposed within said enclosure, said lay shaft having a longitudinal axis disposed spaced and parallel relative to a rotational axis of said main shaft;
   a gear assembly disposed within said enclosure such that said gear assembly is supported by said lay shaft for rotation thereof about said longitudinal axis, said gear assembly defining a driven gear and a driving gear disposed axially relative to said driven gear, said driven gear intermeshing with said first gear wheel such that, when said first gear wheel rotates about said rotational axis of said main shaft, said intermeshing driven gear is rotated about said longitudinal axis of said lay shaft for rotating said gear assembly including said driving gear;
   a second gear wheel intermeshing with said driving gear, said second gear wheel defining a bore for the rotatable reception therein of said output shaft;
   a synchro device operably disposed between said first and second gear wheels such that, in a first disposition of said synchro device, the motor rotates said main shaft which drives said first gear wheel for rotating said gear assembly for rotating said second gear wheel, said synchro device drivingly connecting said second gear wheel to said output shaft so that a first gear ratio is established between said input and said output shafts and such that in a second disposition of said synchro device, the motor rotates said main shaft, said synchro device drivingly connecting said main shaft directly to said output shaft and disconnecting said second gear wheel from a driving connection to said output shaft so that a second gear ratio is established between said input and said output shafts; and
   an electro-hydraulic actuator operatively connected to said synchro device for selectively moving said synchro device between said first and second dispositions thereof for selectively establishing said first and second gear ratios.

2. A transmission apparatus as set forth in claim 1 wherein said housing includes:
   a bell housing having a first and a second extremity;
   said first extremity of said bell housing defining a flange for mounting said bell housing to the motor;
   said bell housing having an extension extending from said first extremity of said bell housing for receiving a starting motor;
   a main housing having a first and a second end, said first end of said main housing being secured adjacent to said second extremity of said bell housing;
   an output housing having a front end and a rear end, said front end of said output housing being secured to said second end of said main housing such that said main housing is disposed between said bell housing and said output housing.

3. A transmission apparatus as set forth in claim 1 wherein said planetary gear train includes:
   a plurality of pairs of cylindrical gears, each cylindrical gear being disposed between said input shaft and said casing such that for each pair of gears, a first cylindrical gear intermeshes with said input shaft and a second cylindrical gear intermeshes with an internal gear ring defined by said casing, said first and second cylindrical gears intermeshing with each other.

4. A transmission apparatus as set forth in claim 3 further including:
   an electronic control for selecting said first and said second mode of operation so that, in said first mode of operation, the tractor moves forwardly and in said second mode of operation, the tractor moves rearwardly, said electronic control being connected to a source of hydraulic pressure within said transmission enclosure;
a forward clutch including:
a chamber selectively connected to said source of hydraulic pressure;
a plurality of clutch plates operably disposed between said input shaft and said casing such that in said first mode of operation, when said chamber is connected to said source of hydraulic pressure, said clutch plates are urged against said casing so that said casing rotates together with said input shaft such that said tractor moves forwardly;
a reverse clutch including:
a further chamber defined by said housing, said further chamber being selectively connected to said source of hydraulic pressure such that in said second mode of operation, said further chamber is connected to said source of hydraulic pressure;
a piston slidably disposed within said further chamber such that when said further chamber is connected to said source of hydraulic pressure, said piston is moved axially along said further chamber;
a plurality of further clutch plates disposed between said piston and said casing such that, in said second mode of operation, said piston moves along said chamber for urging said further clutch plates against said casing for inhibiting rotation of said casing relative to said housing so that the tractor moves rearwardly.

5. A transmission apparatus as set forth in claim 4 wherein said electronic control generates a signal for a delayed control of said synchro device such that said synchro device is operated in response to disengagement of said clutch plates and said further clutch plates so that time is permitted for selection of said gear ratios.

6. A transmission apparatus as set forth in claim 4 further including:
a pressure relief valve disposed in fluid communication with said further chamber for limiting pressure applied to said piston and said chamber.

7. A transmission apparatus as set forth in claim 6 wherein said driven end of said main shaft defines a flange, said flange defining a plurality of holes for the reception therein of said pinions of said planetary gear train support so that said pinions are secured to said flange adjacent to a periphery of said flange.

8. A transmission apparatus as set forth in claim 4 wherein said casing, in said first mode of operation rotates together with said input shaft and in said second mode of operation, rotational movement of said casing relative to said housing is inhibited.

9. A transmission apparatus as set forth in claim 3 wherein said planetary gear train support includes:
a plurality of pinions, each pinion extending through and rotatably supporting a cylindrical gear of said planetary gear train.

10. A transmission apparatus as set forth in claim 1 wherein said synchro device includes:
a slider ring secured to and disposed coaxially relative to said first gear wheel, said slider ring defining an annular groove such that, when said slider ring is moved axially relative to said main shaft, said slider ring moves axially along said output shaft, the arrangement being structured such that, in said first disposition, said first gear wheel drives said output shaft via said gear assembly and in said second disposition, said first gear wheel is directly connected to said output shaft via said slider ring, for driving said output shaft.

11. A transmission apparatus as set forth in claim 10 wherein said synchro device includes:
synchronizing cones for selectively synchronizing transmission to said output shaft from said second gear wheel in said first disposition and from said first gear wheel in said second disposition.

12. A transmission apparatus as set forth in claim 10 wherein said actuator includes:
an actuator arm disposed within said housing, said actuator arm riding within said annular groove so that when said actuator arm is moved axially relative to said main shaft, said slider ring is moved axially along said output shall for selectively establishing said first and second gear ratios.

13. A transmission apparatus as set forth in claim 12 wherein said actuator includes:
a slave piston slidably disposed within a cavity defined by said housing such that said slave piston separates said cavity into a first and second compartment respectively;
said slave piston being secured to said actuator arm such that, when said slave piston moves within and axially along said cavity, said actuator arm moves said slider ring for selectively engaging said first and second gear ratios.

14. A transmission apparatus as set forth in claim 13 wherein said actuator includes:
an electro magnetic solenoid;
a servo valve secured to said solenoid, said servo valve being connected to a source of hydraulic pressure such that when said solenoid is energized, said solenoid and servo valve secured thereto move axially from a first to a second location thereof such that, when said servo valve is disposed in said first location thereof, said source of hydraulic pressure is connected to said first compartment and when said servo valve is disposed in said second location thereof, said source of hydraulic pressure is connected to said second compartment so that, when said solenoid is energized, said slider ring is moved axially along said output shaft so that said transmission apparatus is changed from said first to said second gear ratio.

15. A transmission apparatus as set forth in claim 14 wherein said said actuator includes:
a pressure relief device disposed within said slave piston such that, when a maximum permissible hydraulic pressure is reached within said second compartment, said pressure relief device opens to inhibit over pressurizing said second compartment so that a smooth transition between gear ratios is attained.

16. A transmission apparatus as set forth in claim 14 further including:
a sensor for sensing a rate of rotation of said input shaft;
a further sensor for sensing a rate of rotation of said output shaft;
an electronic control electrically connected to said sensors for analyzing input from said sensors and for generating an output signal for controlling energizing of said electro magnetic solenoid.

17. A transmission apparatus for transmitting power from a motor for driving an airport ground support tractor, said transmission apparatus comprising:
a housing having an input end and an output end, said housing defining a transmission enclosure;
a torque converter disposed within said housing said torque converter including:
an input driven by the motor;
an output for transmitting torque from the motor;

an automatic transmission including:
an input shaft rotatably supported within said housing, said input shaft having a first and a second extremity, said first extremity of said input shaft being driven by said output of said torque converter;
a planetary gear train driven by said input shaft of said automatic transmission for providing a forward and a reverse output;
an output shaft rotatably supported within said housing, said output shaft having a first end and a second end, said first end of said output shaft being driven by said output of said planetary gear train so that said torque converter is disposed between the motor and said automatic transmission;
a gearbox drivingly connected to said second end of said output shaft of said automatic transmission such that said automatic transmission is disposed between said torque converter and said gearbox;
said gearbox including:
a plurality of gear wheels for providing at least a first and a second gear ratio; and
an electro hydraulic actuator for mechanically selecting said gear ratios.

18. A transmission apparatus for transmitting power from a motor for driving an airport ground support tractor, said transmission apparatus comprising:
a housing having an input end and an output end, said housing defining a transmission enclosure;
a torque converter disposed within said housing, said torque converter having an input driven by the motor and an output for transmitting torque from the motor;
an input shaft rotatably supported within said housing, said input shaft having a first and a second extremity, said first extremity of said input shaft being driven by said output from said torque converter;
a planetary gear train intermeshing with said input shaft, said gear train being disposed between said first and second extremities of said input shaft;
a planetary gear train support for rotatably supporting said planetary gear train;
a casing disposed coaxially relative to said input shaft, said casing intermeshing with said gear train, said input shaft being rotated in a first rotational direction;
said planetary gear train being structured such that in a first mode of operation, when said input shaft is rotated in said first rotational direction, said planetary gear train support is rotated in said first rotational direction and in a second mode of operation, when said input shaft is rotated in said first rotational direction, rotation of said casing relative to said housing is inhibited so that said planetary gear train support rotates in a second rotational direction opposite to said first rotational direction;
a main shaft having a driven end and a driving end, said main shaft being rotatably supported by said housing such that said driven end of said main shaft is secured to said planetary gear train support so that said planetary gear train support selectively drives said main shaft in said first rotational direction and second rotational direction;
an output shaft having a first end and a second end, said output shaft being rotatably supported by said housing such that said output shaft is disposed coaxially relative to said main shaft so that said output shaft is selectively driven by said driving end of said main shaft;
a first gear wheel defining a splined bore, said splined bore intermeshing with an external spline defined by said main shaft so that when said main shaft is rotating, said external spline and intermeshing splined bore cooperate for rotating said first gear wheel;
a lay shaft disposed within said enclosure, said lay shaft having a longitudinal axis disposed spaced and parallel relative to a rotational axis of said main shaft;
a gear assembly disposed within said enclosure such that said gear assembly is supported by said lay shaft for rotation thereof about said longitudinal axis, said gear assembly defining a driven gear and a driving gear disposed axially relative to said driven gear, said driven gear intermeshing with said first gear wheel such that, when said first gear wheel rotates about said rotational axis of said main shaft, said intermeshing driven gear is rotated about said longitudinal axis of said lay shaft for rotating said gear assembly including said driving gear;
a second gear wheel intermeshing with said driving gear, said second gear wheel defining a bore for the rotatable reception therein of said output shaft;
a synchro device operably disposed between said first and second gear wheels such that, in a first disposition of said synchro device, the motor rotates said main shaft which drives said first gear wheel for rotating said gear assembly for rotating said second gear wheel, said synchro device drivingly connecting said second gear wheel to said output shaft so that a first gear ratio is established between said input and said output shafts and such that in a second disposition of said synchro device, the motor rotates said main shaft, said synchro device drivingly connecting said main shaft to said output shaft and disconnecting said second gear wheel from a driving connection to said output shaft so that a second gear ratio is established between said input and said output shafts;
an electro-hydraulic actuator operatively connected to said synchro device for selectively moving said synchro device between said first and second dispositions thereof for selectively establishing said first and second gear ratios;
said housing including:
a bell housing having a first and a second extremity;
said first extremity of said bell housing defining a flange for mounting said bell housing to the motor;
said bell housing having an extension extending from said first extremity of said bell housing for receiving a starting motor;
a main housing having a first and a second end, said first end of said main housing being secured adjacent to said second extremity of said bell housing;
an output housing having a front end and a rear end, said front end of said output housing being secured to said second end of said main housing such that said main housing is disposed between said bell housing and said output housing;
said planetary gear train including:
a plurality of pairs of cylindrical gears, each cylindrical gear being disposed between said input shaft and said casing such that for each pair of gears, a first cylindrical gear intermeshes with said input shaft and a second cylindrical gear intermeshes with an internal gear ring defined by said casing, said first and second cylindrical gears intermeshing with each other;
an electronic control for selecting said first and said second mode of operation so that, in said first mode of operation, the tractor moves forwardly and in said second mode of operation, the tractor moves rearwardly, said electronic control being connected to a source of hydraulic pressure within said transmission enclosure;
a forward clutch including:

a chamber selectively connected to said source of hydraulic pressure;

a plurality of clutch plates operably disposed between said input shaft and said casing such that in said first mode of operation, when said chamber is connected to said source of hydraulic pressure, said clutch plates are urged against said casing so that said casing rotates together with said input shaft such that said tractor moves forwardly;

a reverse clutch including:

a further chamber defined by said housing, said further chamber being selectively connected to said source of hydraulic pressure such that in said second mode of operation, said further chamber is connected to said source of hydraulic pressure;

a piston slidably disposed within said further chamber such that when said further chamber is connected to said source of hydraulic pressure, said piston is moved axially along said further chamber;

a plurality of further clutch plates disposed between said piston and said casing such that, in said second mode of operation, said piston moves along said chamber for urging said further clutch plates against said casing for inhibiting rotation of said casing relative to said housing so that the tractor moves rearwardly;

said electronic control generating a signal for a delayed control of said synchro device such that said synchro device is operated in response to disengagement of said clutch plates and said further clutch plates so that time is permitted for selection of said gear ratios;

a pressure relief valve disposed in fluid communication with said further chamber for limiting pressure applied to said piston and said chamber;

said planetary gear train support including:

a plurality of pinions, each pinion extending through and rotatably supporting a cylindrical gear of said planetary gear train;

said casing, in said first mode of operation rotating together with said input shaft and in said second mode of operation, rotational movement of said casing relative to said housing is inhibited;

said driven end of said main shaft defining a flange, said flange defining a plurality of holes for the reception therein of said pinions of said planetary gear train support so that said pinions are secured to said flange adjacent to a periphery of said flange;

said synchro device including:

a slider ring secured to and disposed coaxially relative to said first gear wheel, said slider ring defining an annular groove such that, when said slider ring is moved axially relative to said main shaft, said slider ring is moved axially along said output shaft, said slider ring defining a further splined bore which cooperates with a further external spline defined by said output shaft, the arrangement being structured such that, in said first disposition, said first gear wheel drives said output shaft via said gear assembly and in said second disposition, said slider ring is moved axially along said output shaft so that said first gear wheel is drivingly connected to said output shaft via said slider ring for driving said output shaft;

said synchro device further including:

synchronizing cones for selectively synchronizing transmission to said output shaft from said second gear wheel in said first disposition and from said first gear wheel in said second disposition;

said actuator including:

an actuator arm disposed within said housing, said actuator arm riding within said annular groove so that when said actuator arm is moved axially relative to said main shaft, said slider ring is moved axially along said output shaft for selectively establishing said first and second gear ratios;

said actuator further including:

a slave piston slidably disposed within a cavity defined by said housing such that said slave piston separates said cavity into a first and second compartment respectively;

said slave piston being secured to said actuator arm such that, when said slave piston moves within and axially along said cavity, said actuator arm moves said slider ring for selectively engaging said first and second gear ratios;

an electro magnetic solenoid;

a servo valve secured to said solenoid, said servo valve being connected to a source of hydraulic pressure such that when said solenoid is energized, said solenoid and servo valve secured thereto move axially from a first to a second location thereof such that, when said servo valve is disposed in said first location thereof, said source of hydraulic pressure is connected to said first compartment and when said servo valve is disposed in said second location thereof, said source of hydraulic pressure is connected to said second compartment so that, when said solenoid is energized, said slider ring is moved axially along said output shaft so that said transmission apparatus is changed from said first to said second gear ratio;

a pressure relief device disposed within said slave piston such that, when a maximum permissible hydraulic pressure is reached within said second compartment, said pressure relief device opens to inhibit over pressurizing said second compartment so that a smooth transition between gear ratios is attained;

a sensor for sensing a rate of rotation of said input shaft;

a further sensor for sensing a rate of rotation of said output shaft; and an electronic control electrically connected to said sensors for analyzing input from said sensors and for generating an output signal for controlling energizing of said electro magnetic solenoid.

* * * * *